US010585343B2

(12) United States Patent
Yasumatsu et al.

(10) Patent No.: US 10,585,343 B2
(45) Date of Patent: Mar. 10, 2020

(54) LIGHT SOURCE UNIT, ILLUMINATOR, AND PROJECTOR

(71) Applicant: SEIKO EPSON CORPORATION, Tokyo (JP)

(72) Inventors: Wataru Yasumatsu, Azumino (JP); Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 106 days.

(21) Appl. No.: 15/648,803

(22) Filed: Jul. 13, 2017

(65) Prior Publication Data
US 2018/0031959 A1 Feb. 1, 2018

(30) Foreign Application Priority Data

Jul. 26, 2016 (JP) .................. 2016-146421

(51) Int. Cl.
G03B 21/20 (2006.01)
H04N 9/31 (2006.01)
F21V 5/00 (2018.01)
F21V 13/06 (2006.01)
G02B 19/00 (2006.01)
(Continued)

(52) U.S. Cl.
CPC .......... G03B 21/208 (2013.01); F21V 5/007 (2013.01); F21V 5/008 (2013.01); F21V 13/06 (2013.01); G02B 19/0009 (2013.01); G02B 19/0057 (2013.01); G03B 21/2013 (2013.01); H04N 9/3152 (2013.01); H04N 9/3161 (2013.01); H04N 9/3164 (2013.01); F21Y 2115/30 (2016.08); G03B 21/204 (2013.01); G03B 21/2066 (2013.01); G03B 33/12 (2013.01)

(58) Field of Classification Search
CPC ... G03B 21/208; G03B 21/2013; F21V 5/007; F21V 5/008; H04N 9/31
USPC .......................................................... 353/94
See application file for complete search history.

(56) References Cited

U.S. PATENT DOCUMENTS

2005/0122487 A1* 6/2005 Koyama ................. A47F 11/06
353/94
2005/0281029 A1* 12/2005 Inamoto .................... H04N 5/74
362/234
(Continued)

FOREIGN PATENT DOCUMENTS

JP 2004-341072 A 12/2004
JP 2012-118302 A 6/2012
(Continued)

Primary Examiner — Jerry L Brooks
(74) Attorney, Agent, or Firm — Oliff PLC

(57) ABSTRACT

A light source unit includes one or more light source rows that include a first light source row including light emitting devices. The light emitting devices of the first light source rows are arranged at non-uniform intervals. An illuminator includes a light source unit for emitting a bundle of light beams, a first fly-eye lens including lenslets, a second fly-eye lens, and a condenser lens. The light source unit includes one or more light source rows each including light emitting devices. The principal rays of first light beams outputted from a first light source row out of the one or more light source rows enter different lenslets out of the lenslets. A positional relationship between a principal ray of each of the first light beams and the optical axis of the lenslet which the principal ray enters is aperiodic over the first light source row.

18 Claims, 9 Drawing Sheets

(51) Int. Cl.
*F21Y 115/30* (2016.01)
*G03B 33/12* (2006.01)

(56) References Cited

U.S. PATENT DOCUMENTS

| | | | | |
|---|---|---|---|---|
| 2009/0284713 | A1* | 11/2009 | Silverstein | G02B 27/1033 |
| | | | | 353/8 |
| 2012/0139445 | A1* | 6/2012 | Fujiwara | G02F 1/133603 |
| | | | | 315/294 |
| 2013/0010215 | A1 | 1/2013 | Taketsu et al. | |
| 2013/0308104 | A1* | 11/2013 | Nishimori | G03B 21/2013 |
| | | | | 353/37 |
| 2014/0168971 | A1 | 6/2014 | Kurosaki | |
| 2015/0293271 | A1 | 10/2015 | Miyasaka et al. | |
| 2016/0062223 | A1 | 3/2016 | Akiyama | |
| 2019/0049097 | A1* | 2/2019 | Rossi | G01S 7/4815 |

FOREIGN PATENT DOCUMENTS

| | | |
|---|---|---|
| JP | 2013-015762 A | 1/2013 |
| JP | 2014-060452 A | 4/2014 |
| JP | 2014-123013 A | 7/2014 |
| JP | 2014-174442 A | 9/2014 |
| JP | 2015-057632 A | 3/2015 |
| JP | 2015-60092 A | 3/2015 |
| JP | 2015-132665 A | 7/2015 |
| JP | 2016-051013 A | 4/2016 |

\* cited by examiner

LIGHT SOURCE UNIT, ILLUMINATOR, AND PROJECTOR

BACKGROUND

1. Technical Field

The present invention relates to a light source unit, an illuminator, and a projector.

2. Related Art

As an illuminator used, for example, in a projector, an illuminator using a solid state light source, such as a semiconductor laser, has been proposed. JP-A-2012-118302 discloses an illuminator including a solid-state light source group formed of a plurality of solid-state light sources, a collimator lens group formed of a plurality of collimator lenses that parallelize light beams from the plurality of solid-state light sources, a first reflector and a second reflector that reflect the light beams through the collimator lens group, a light collection system that collects the light beams from the second reflector, and a homogenizer system that homogenizes the intensity distribution of the light through the light collection system.

In the illuminator disclosed in JP-A-2012-118302, the light beams from the plurality of solid-state light sources excite a phosphor, and fluorescence produced by the phosphor is used as part of illumination light. The homogenizer system is formed of a first lens array and a second lens array. The homogenizer system uniformly irradiates the phosphor with the light beams emitted from the plurality of solid-state light sources. In the configuration described above, however, the uniformity of the illuminance distribution on the phosphor is insufficient, and further improvement in the uniformity has been desired.

SUMMARY

An advantage of some aspects of the invention is to provide an illuminator that allows excellent uniformity of the illuminance distribution in an area to be illuminated. Another advantage of some aspects of the invention is to provide a light source unit suitable for the illuminator. Still another advantage of some aspects of the invention is to provide a projector including the illuminator.

A light source unit according to an aspect of the invention includes one or more light source rows that include a first light source row including light emitting devices, and the light emitting devices of the first light source rows are arranged at non-uniform intervals.

An illuminator according to another aspect of the invention includes a light source unit that includes one or more light source rows each formed of a plurality of light emitting devices and outputs a light beam bundle, a first fly-eye lens that is provided in a position downstream of the light source unit and includes a plurality of lenslets, a second fly-eye lens that is provided in a position downstream of the first fly-eye lens, and a condenser lens that is provided in a position downstream of the second fly-eye lens. Principal rays of a plurality of first light beams outputted from a first light source row out of the one or more light source rows are incident on different lenslets out of the plurality of lenslets, and a positional relationship between the principal ray of each of the plurality of first light beams and an optical axis of the lenslet on which the principal ray is incident out of the plurality of lenslets is aperiodic over the first light source row.

In the illuminator according to the aspect of the invention, the principal rays of the plurality of first light beams are incident on different lenslets out of the plurality of lenslets of the first fly-eye lens. Since the positional relationship between the principal ray of each light beam and the optical axis of the lenslet on which the principal ray is incident is aperiodic over the first light source row, the luminance distributions on the lenslets of the first fly-eye lens differ from one another, and the plurality of light beams having luminance distributions different from one another are superimposed on one another in an area to be illuminated by the second fly-eye lens and the condenser lens. The uniformity of the illuminance distribution in the area to be illuminated can therefore be increased as compared with the uniformity in related art.

In the illuminator according to the aspect of the invention, the plurality of lenslets may be arranged in a lattice pattern along a first direction and a second direction, and when the light beam bundle enters the first fly-eye lens, the plurality of first light beams maybe arranged in the first direction, and an arrangement pitch of the plurality of first light beams in the first direction may be a non-integer multiple of an arrangement pitch of the plurality of lenslets in the first direction.

In the configuration described above, since the arrangement pitch of the plurality of first light beams in the first direction is a non-integer multiple of the arrangement pitch of the plurality of lenslets in the first direction, the plurality of first light beams are incident on different positions on the corresponding ones of the plurality of lenslets. The luminance distributions on the plurality of lenslets of the first fly-eye lens therefore differ from one another, whereby the uniformity of the illuminance distribution in the area to be illuminated can be increased as compared with the uniformity in related art. According to the configuration described above, the uniformity of the illuminance distribution can be readily improved without very complex arrangements of the light emitting devices and the lenslets.

In the illuminator according to the aspect of the invention, the one or more light source rows may include a plurality of light source rows, and when the light beam bundle enters the first fly-eye lens, the light beam bundle may have a cross-section that is similar to a shape of an area where the plurality of lenslets are arranged, which cross-section is parallel to a plane in which the plurality of lenslets are arranged. The cross-section maybe smaller than the area where the plurality of lenslets are arranged.

According to the configuration described above, the plurality of first light beams is allowed to be efficiently incident on the plurality of lenslets.

In the illuminator according to the aspect of the invention, the light source unit may further include a base that supports the one or more light source rows and still further include one or more reflection elements provided in correspondence with the one or more light source rows. A direction in which the first light source row outputs the plurality of first light beams may be roughly parallel to a surface on which the one or more light source rows are arranged. The one or more reflection elements may each have one reflection surface. A first reflection element out of the one or more reflection elements may be so disposed that the plurality of first light beams outputted from the first light source row reflects off the reflection surface of the first reflection element to enter the first fly-eye lens.

According to the configuration described above, since the plurality of first light beams reflects off the single common reflection surface, the reflection element has a simple configuration.

A projector according to another aspect of the invention includes the illuminator according to the aspect of the invention, a light modulator that modulates light outputted from the illuminator in accordance with image information, and a projection system that projects the light modulated by the light modulator.

According to the configuration described above, the projector, which includes the illuminator according to the aspect of the invention, can project a bright image.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
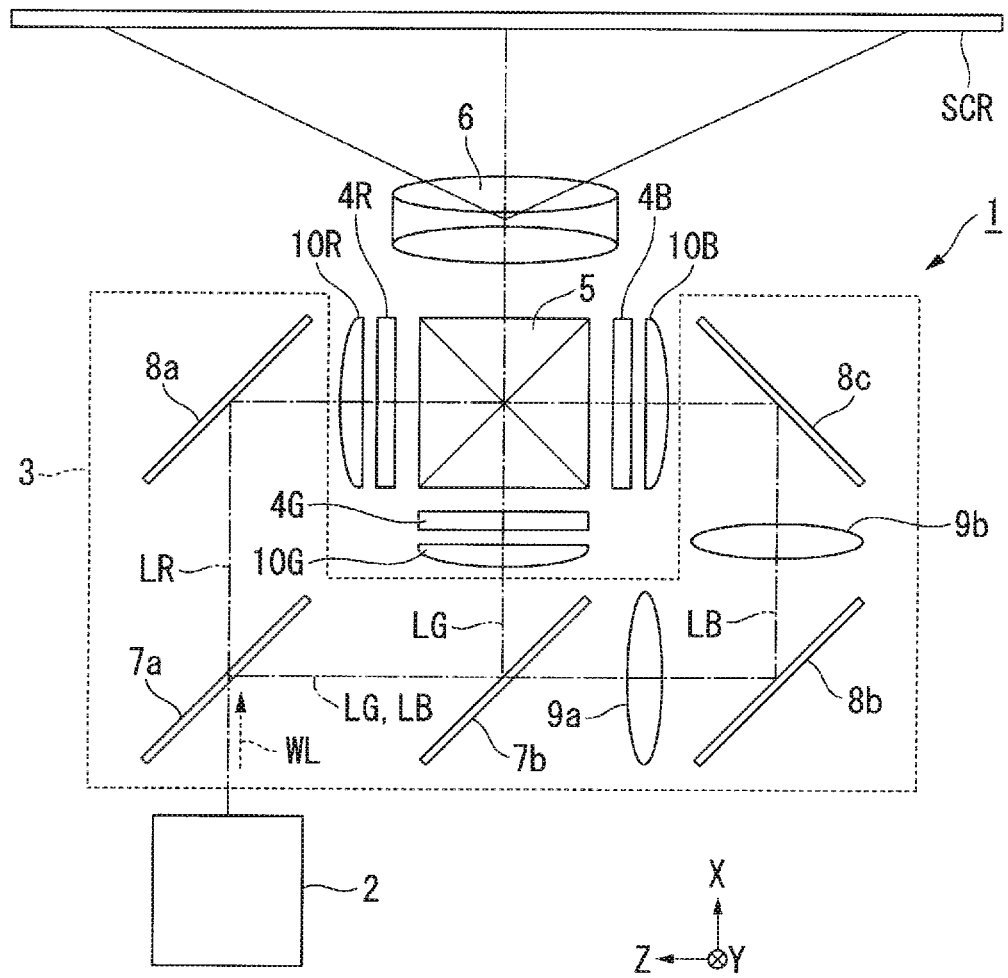
FIG. 1 is a schematic configuration diagram of a projector according to a first embodiment.

A first embodiment of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

Projector

A projector according the present embodiment is a projection-type image display apparatus that displays color video images on a screen (surface on which images are projected). The projector includes three liquid crystal light modulators corresponding to respective color light: red light, green light, and blue light. The projector further includes laser diodes, each of which produces high-luminance, high-intensity light, as a light source of an illuminator.

FIG. 1 is a schematic configuration diagram showing the optical system of the projector according to the present embodiment.

A projector 1 includes an illuminator 2, a color separation system 3, a light modulator 4R, a light modulator 4G, a light modulator 4B, a light combining system 5, and a projection system 6, as shown in FIG. 1.

In the present embodiment, the illuminator 2 outputs white light W as illumination light toward the color separation system 3.

The color separation system 3 separates the white light W into red light LR, green light LG, and blue light LB. The color separation system 3 includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a transmits the red light LR but reflects the other light (green light LG and blue light LB). The second dichroic mirror 7b reflects the green light LG but transmits the blue light LB.

The first total reflection mirror 8a is disposed in the optical path of the red light LR and reflects the red light LR having passed through the first dichroic mirror 7a toward the light modulator 4R. The second total reflection mirror 8b and the third total reflection mirror 8c are disposed in the optical path of the blue light LB and guide the blue light LB having passed through the second dichroic mirror 7b toward the light modulator 4B. The green light LG is reflected by the second dichroic mirror 7b toward the light modulator 4G.

The first relay lens 9a and the second relay lens 9b are disposed in the optical path of the blue light LB and in positions downstream of the second dichroic mirror 7b. The first relay lens 9a and the second relay lens 9b compensate for loss of the blue light LB due to the fact that the optical path of the blue light LB is longer than the optical path of the red light LR or the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers (not shown) are disposed on the light incident side and the light exiting side of each of the liquid crystal panels.

Fields lenses 10R, 10G, and 10B are disposed on the light incident side of the light modulators 4R, 4G, and 4B, respectively. The fields lenses 10R, 10G, and 10B parallelize the red light LR to be incident on the light modulator 4R, the green light LG to be incident on the light modulator 4G, and the blue light LB to be incident on the light modulator 4B, respectively.

The light combining system 5 combines the image light fluxes corresponding to the red light LR, the green light LG, and the blue light LB with one another and outputs the combined image light toward the projection system 6. The light combining system 5 is, for example, a cross dichroic prism.

The projection system 6 is formed of a projection lens group including a plurality of projection lenses. The projection system 6 enlarges the combined image light from the light combining system 5 and projects the enlarged image light toward a screen SCR. Enlarged color video images are thus displayed on the screen SCR.

Illuminator

The illuminator 2 according to the first embodiment will be described below.

Figure 2:
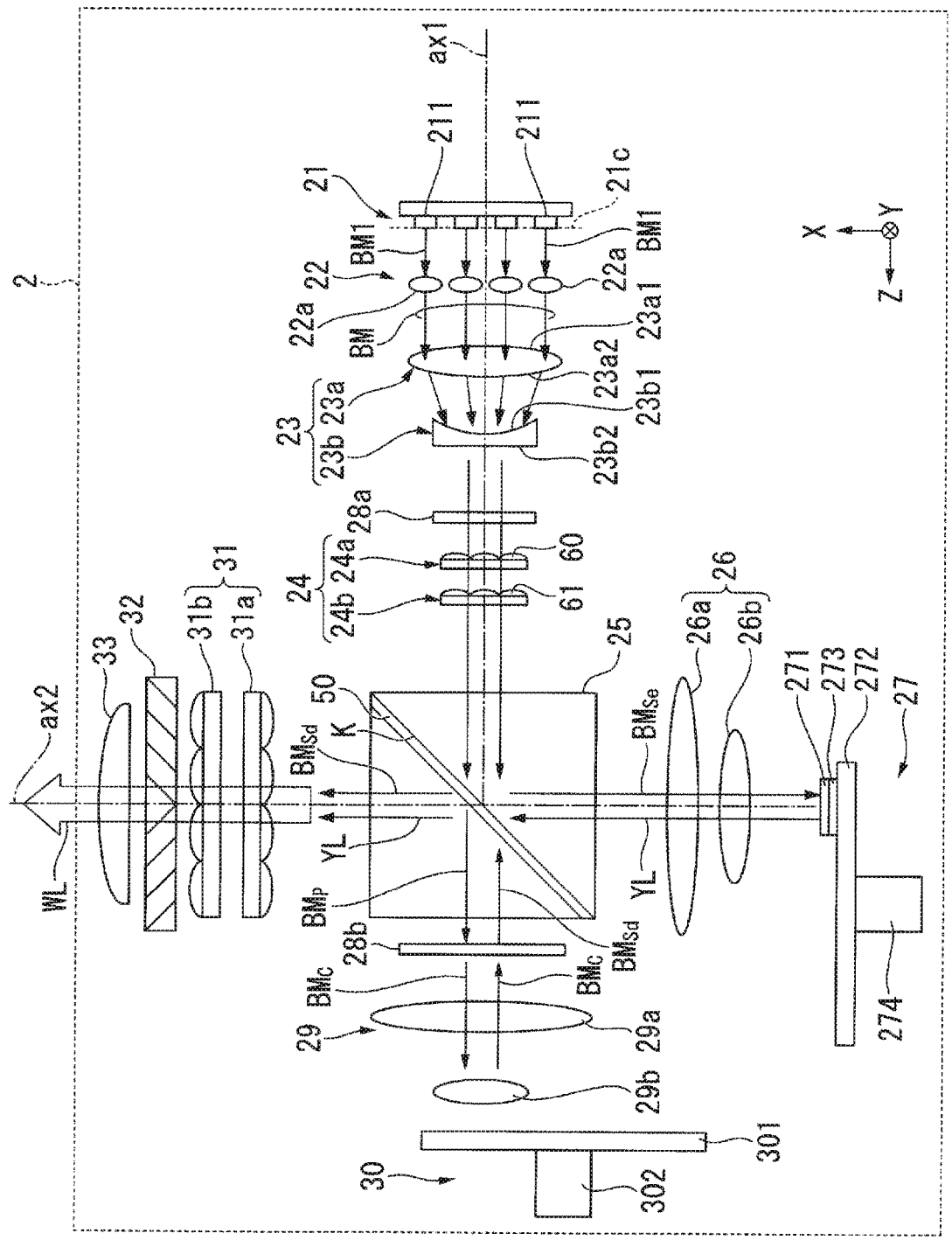
FIG. 2 is a schematic configuration diagram of an illuminator according to the first embodiment.

FIG. 2 is a schematic configuration diagram of the illuminator 2.

The illuminator 2 includes a light source unit 21, a collimator system 22, an afocal system 23, a first retardation film 28a, a homogenizer system 24, an optical element 25 including a polarization separation element 50, a first pickup system 26, a fluorescence emitting element 27, a second retardation film 28b, a second pickup system 29, a diffusive reflection element 30, an optical integration system 31, a polarization conversion element 32, and a superimposing system 33, as shown in FIG. 2.

The light source unit 21, the collimator system 22, the afocal system 23, the first retardation film 28a, the homogenizer system 24, the optical element 25, the second retardation film 28b, the second pickup system 29, and the diffusive reflection element 30 are so sequentially arranged along an optical axis ax1 shown in FIG. 2 that the optical centers of the components described above coincide with the optical axis ax1. On the other hand, the fluorescence emitting element 27, the first pickup system 26, the optical element 25, the optical integration system 31, the polarization conversion element 32, and the superimposing system 33 are sequentially arranged along an optical axis ax2. The optical axes ax1 and ax2 are present in the same plane and perpendicular to each other.

The light source unit 21 includes a plurality of semiconductor lasers 211 (light emitting devices). The plurality of semiconductor lasers 211 are arranged in an array in a plane perpendicular to the optical axis ax1 (XY plane).

The configuration of the light source unit 21 will be described in detail with reference to FIGS. 3 and 4.

Figure 3:
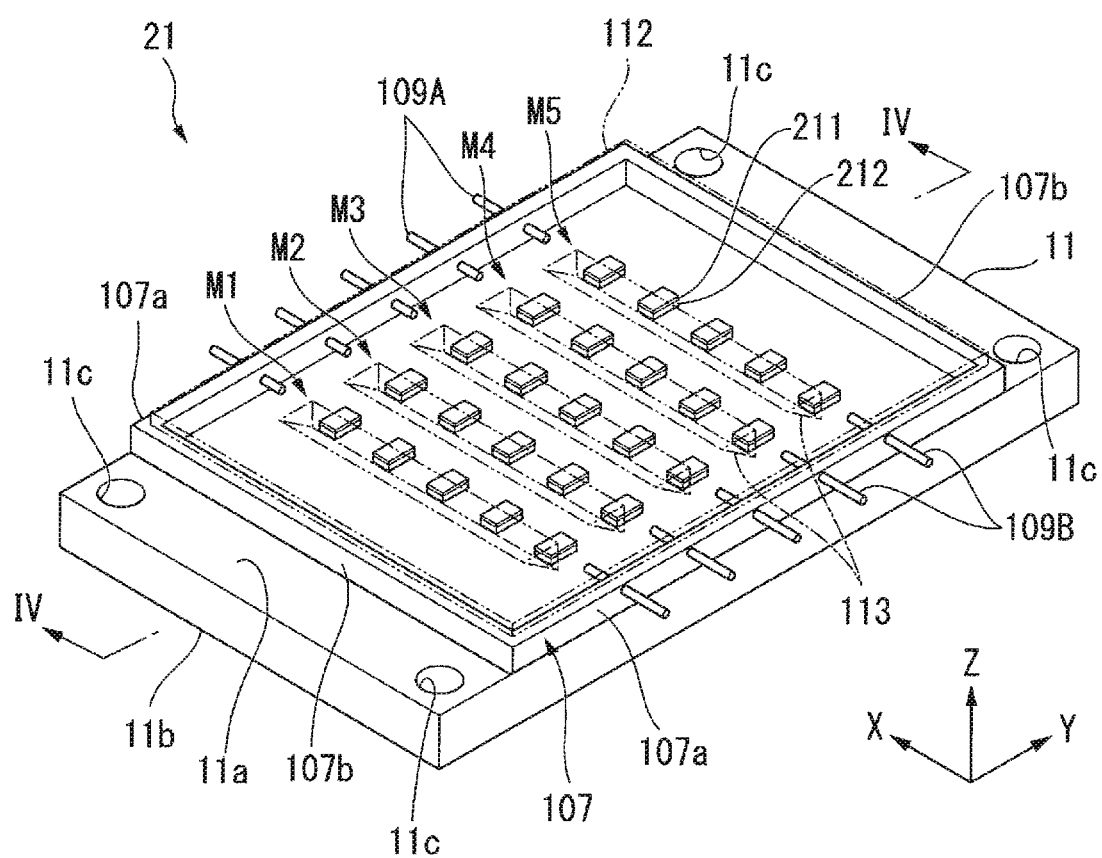
FIG. 3 is a perspective view of a light source unit according to the first embodiment.

FIG. 3 is a perspective view of the light source unit 21 according to the present embodiment. FIG. 4 shows the light source unit 21 and is a perspective cross-sectional view taken along the line IV-IV in FIG. 3.

Figure 4:
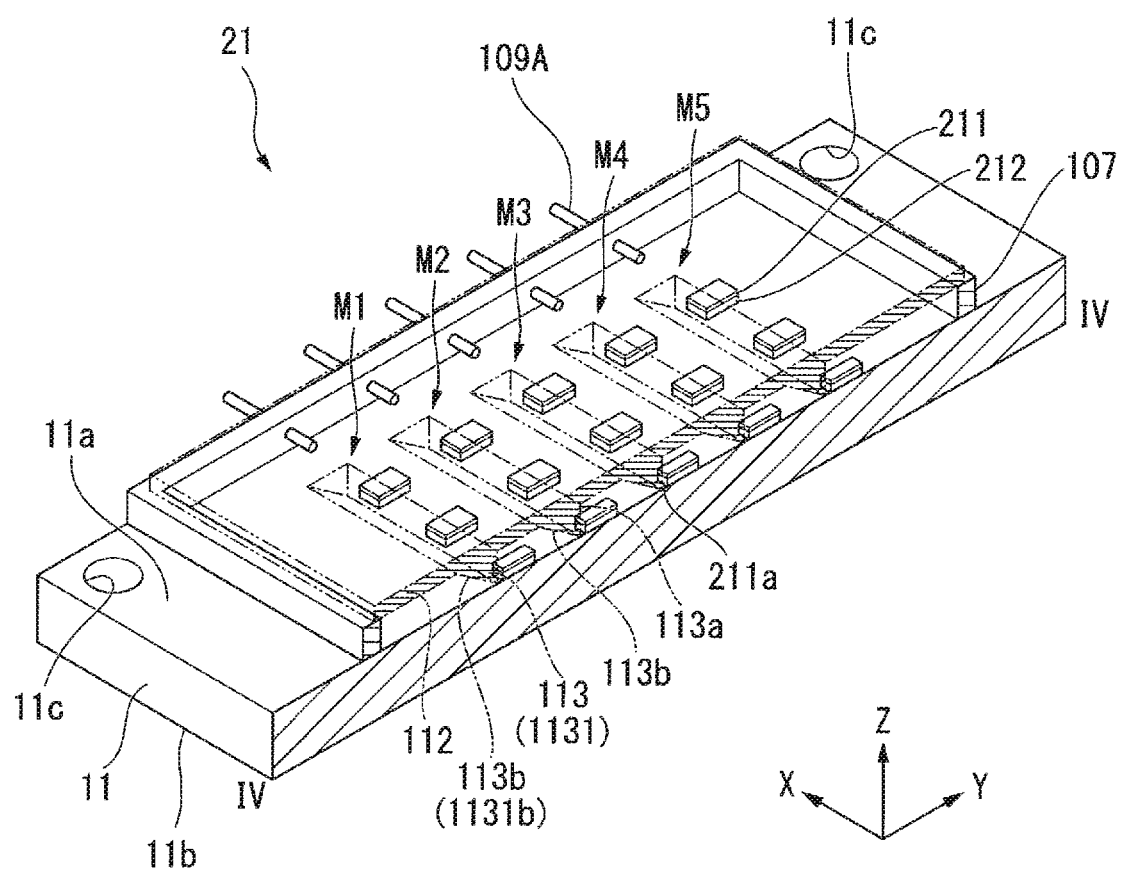
FIG. 4 is a perspective cross-sectional view taken along the line IV-IV in FIG. 3.

The light source unit 21 includes a base substrate 11 (base), the plurality of semiconductor lasers 211 (light emitting devices), a plurality of sub-mounts 212, a bonding frame 107, a plurality of electrodes 109A, a plurality of electrodes 109B, a light transmissive member 112, a plurality of prisms 113 (reflection elements), as shown in FIGS. 3 and 4.

The light source unit 21 has light source rows M1, M2, M3, M4, and M5, each of which is formed of a plurality of the semiconductor lasers 211 (light emitting devices), and outputs a bundle of light beams BM (hereinafter, referred to as a "light beam bundle BM") formed of a plurality of light beams BM1, as will be described later. In the present embodiment, the light source unit 21 has the five light source rows, but the number of light source rows is not limited to a specific number.

The base substrate 11 is a plate-shaped member having a first surface 11a and a second surface 11b, which is opposite the first surface 11a. The first surface 11a is the upper surface of the base substrate 11 in FIGS. 3 and 4. The second surface 11b is the lower surface of the base substrate 11 in FIGS. 3 and 4. In a plan view viewed in the direction of a normal to the first surface 11a, the base substrate 11 has, for example, an oblong shape. The base substrate 11 supports the plurality of light source rows M1 to M5.

In the XYZ orthogonal coordinate system shown in the drawings, the Z-axis direction is the direction parallel to the thickness direction of the base substrate 11. The X-axis direction and the Y-axis direction are perpendicular to the Z-axis direction and perpendicular to each other. The X-axis direction is the direction parallel to the widthwise direction of the base substrate 11. The Y-axis direction is the direction parallel to the lengthwise direction of the base substrate 11.

In the following description of the light source unit 21, the direction parallel to the thickness direction of the base substrate 11 (Z-axis direction) is simply referred to as the "thickness direction" in some cases, the direction parallel to the lengthwise direction of the base substrate 11 (Y-axis direction) is simply referred to as the "lengthwise direction" in some cases, and the short-side direction of the base substrate 11 (X-axis direction) is simply referred to as the "widthwise direction" in some cases, unless otherwise noted. Further, the plan view viewed in the direction of a normal to the first surface 11a is simply referred to as the plan view.

The base substrate 11 has through holes 11c formed therein, and the through holes 11c pass through the base substrate 11 in the thickness direction (Z-axis direction). The through holes 11c are formed at the four corners of the base substrate 11, as shown in FIG. 3. The through holes 11c each have a circular shape in the plan view. For example, screws that fix the base substrate 11 to an enclosure or any other component of the projector 1 are inserted through the through holes 11c. The base substrate 11 is preferably made of a metal having high thermal conductivity, such as copper, for efficient dissipation of heat generated by the semiconductor lasers 211.

In the following description, the light source rows are referred to as the light source rows M1 to M5, as shown in FIGS. 3 and 4. In a case where the light source rows M1 to M5 are not distinguished from one another, the light source rows M1 to M5 are collectively referred simply to as light source rows M.

The plurality of semiconductor lasers 211 are disposed on the first surface 11a, as shown in FIG. 3. The light source rows M1 to M5 extend in the widthwise direction. The light source rows M1 to M5 are arranged along the lengthwise direction (Y-axis direction). Therefore, 25 semiconductor lasers 211 are arranged in an array along the widthwise direction (X-axis direction) and the lengthwise direction (Y-axis direction) with the semiconductor lasers 211 separated from each other by a predetermined gap.

The semiconductor lasers 211 each emit a laser beam L in the lengthwise direction. The semiconductor lasers 211 are mounted on the base substrate 11 via the sub-mounts 212. The sub-mounts 212 are provided on the first surface 11a. The sub-mounts 212 each have, for example, a rectangular shape in the plan view. The sub-mounts 212 are primarily made of a ceramic material, such as aluminum nitride and alumina.

The laser beam L emitted from each of the semiconductor lasers 211 is blue light having, for example, a wavelength of 445 nm. The semiconductor lasers 211 may instead emit blue light having a wavelength other than 445 nm (460 nm, for example). The laser beam L is linearly polarized light.

The bonding frame 107 is bonded to the first surface 11a via a bonding material, for example, silver solder and low-melting glass. The bonding frame 107 is a frame-shaped member so provided as to surround the plurality of semiconductor lasers 211. The bonding frame 107 is an oblong frame-shaped member elongated in the lengthwise direction of the base substrate 11 (Y-axis direction) in the plan view.

The bonding frame 107 has a pair of sidewalls 107a, which extend in the lengthwise direction (Y-axis direction), and a pair of sidewalls 107b, which extend in the widthwise direction (X-axis direction). The sidewall 107a on one side (+X side) is provided with the electrodes 109A, and the sidewall 107a on the other side (−X side) is provided with the electrodes 109B. The electrodes 109A are paired with the electrodes 109B that faces the electrodes 109A in correspondence with the light source rows M1 to M5. Although not shown, the electrodes 109A are electrically connected to the anodes of the semiconductor lasers 211. The electrodes 109B are electrically connected to the cathodes of the semiconductor lasers 211. The bonding frame 107 is made, for example, of a ceramic material such as alumina or Kovar.

The light transmissive member 112 is so fixed to the bonding frame 107 as to face the plurality of semiconductor lasers 211. The light transmissive member 112 is fixed to an upper surface 107c that is a surface of the bonding frame 107 and is opposite the base substrate 11 (+Z-side surface). The light transmissive member 112 closes the opening of the bonding frame 107 on one side (+Z side). The light transmissive member 112 has an oblong shape that conforms to the outer edge of the bonding frame 107 in the plan view. The light transmissive member 112 is formed of a light transmissive substrate that transmits the laser beams L emitted from the semiconductor lasers 211. The light transmissive member 112 is made, for example, of glass, quartz, or resin.

The base substrate 11, the bonding frame 107, and the light transmissive member 112 therefore form a sealed accommodation space. The plurality of semiconductor lasers 211 are accommodated in the accommodation space. The accommodation space is filled, for example, with an inert gas or dried air. The accommodation space may instead be maintained in a decompressed state. The decompressed state refers to a state of a space filled with a gas having pressure lower than the typical atmospheric pressure. In this case, the gas with which the space is filled may be an inert gas or dried air. Sealing the accommodation space as described above allows suppression of entry of moisture or outside air into the accommodation space, whereby degradation in the semiconductor lasers 211 can be suppressed.

The plurality of prisms 113 are so formed on a lower surface 112a that is a surface of the light transmissive member 112 and faces the base substrate 11 (−Z-side surface) and integrated with the light transmissive member 112, as shown in FIG. 4. The prisms 113 are provided in correspondence with the light source rows M1 to M5 provided on the base substrate 11. The prisms 113 are disposed in the optical paths of the laser beams L emitted from the plurality of semiconductor lasers 211, which form the light source rows M corresponding to the prisms 113. The prisms 113 extend along the light source rows M in the widthwise direction (X-axis direction). The prisms 113 each have, for example, a triangular cross-sectional shape (ZY cross-section) perpendicular to the direction in which the prisms 113 extend.

The prisms 113 each have at least a light incident surface 113a, on which the laser beam L emitted from the semiconductor laser 211 is incident, and a reflection surface 113b, which reflects at least part of the laser beam incident through the light incident surface 113a. The plurality of prisms 113 are not necessarily formed integrally with the light transmissive member 112 and may be separate from the light transmissive member 112. The plurality of prisms 113 are provided in correspondence with the plurality of light source rows M1 to M5.

In the following description, the light beam BM1 outputted from the first light source row M1 is referred to as a first light beam BM11. Since the first light source row M1 includes five semiconductor lasers 211, the first light source row M1 outputs five first light beams BM11. The direction in which the first light source row M1 outputs the plurality of first light beams BM11 is roughly parallel to the surface on which the plurality of light source rows M1 to M5 are arranged. The surface on which the plurality of light source rows M1 to M5 are arranged is the first surface 11a of the base substrate 11. The first surface 11a of the base substrate 11 is provided in some cases with recesses for accommodating, for example, front end portions of the prisms 113. Even in such cases, the surface on which the plurality of light source rows M1 to M5 are arranged means the first surface 11a of the base substrate 11 and does not mean the inner surfaces of the recesses.

The prism 113 on which the plurality of first light beams BM11 outputted from the first light source row M1 are incident is referred to as a first prism. 1131. The first prism 1131 is so disposed that the plurality of first light beams BM11 outputted from the first light source row M1 reflects off the reflection surface 1131b of the first prism 1131 to enter a first fly-eye lens 24a. Therefore, since the plurality of first light beams BM11 reflects off the single common reflection surface 1131b, the first prism 1131 has a simple configuration.

The light incident surfaces 113a of the prism 113 are surfaces that face the semiconductor lasers 211 (+Y-side surfaces). The light incident surfaces 113a face light exiting surfaced 211a of the semiconductor lasers 211. In the present embodiment, the light incident surfaces 113a are perpendicular to the first surface 11a and perpendicular to the lengthwise direction (Y-axis direction). An antireflection film may be provided on each of the light incident surfaces 113a.

The reflection surfaces 113b of the prisms 113 are surfaces opposite the semiconductor lasers 211 (−Y-side surfaces). The reflection surfaces 113b are inclining surfaces that incline with respect to the first surface 11a and the light incident surfaces 113a. The reflection surfaces 113b incline toward the side separate away in the lengthwise direction (Y-axis direction) from the semiconductor lasers 211 (−Y side) with distance toward the side separate away in the thickness direction (Z-axis direction) from the first surface 11a (+Z side). A reflection film may or may not be provided on each of the reflection surfaces 113b. In the case where no reflection film is provided, it is preferable to cause the light beams BM1 to be incident on the reflection surfaces 113b at an angle that satisfies the total reflection condition. In the case where reflection films are provided, the reflection films may each be divided in correspondence with the semiconductor lasers 211.

The light beam bundle BM is outputted from the light source unit 21 toward the polarization separation element 50, as shown in FIG. 2. As will be described later, part of the light beam bundle BM is separated by the polarization separation element 50 and forms excitation light. The other part that forms the light beam bundle and is separated by the polarization separation element 50 forms blue light for image display.

The light beam bundle BM outputted from the light source unit 21 enters the collimator system 22. The collimator system 22 converts the light beam bundle BM into a parallelized light beam bundle. The collimator system 22 is formed of a plurality of collimator lenses 22a arranged in an array. The plurality of collimator lenses 22a are arranged in correspondence with the plurality of semiconductor lasers 211.

The light beam bundle BM converted by the collimator system 22 into a parallelized light beam bundle enters the afocal system 23. The afocal system 23 changes the width of the light beam bundle BM in the direction perpendicular to the optical axis ax1. The afocal system 23 is formed of a convex lens 23a and a concave lens 23b. The convex lens 23a has a light incident surface 23a1 and a light exiting surface 23a2. The concave lens 23b has a light incident surface 23b1 and a light exiting surface 23b2.

The light beam bundle BM having passed through the afocal system 23 passes through the first retardation film 28a. The first retardation film 28a is formed, for example, of a rotatable half-wave plate. The light beam bundle BM, when passing through the first retardation film 28a, is converted into a light beam bundle formed of an S-polarized component and a P-polarized component mixed with each other at a predetermined ratio. When the first retardation film 28a is rotated, the ratio between the S-polarized component and the P-polarized component contained in the light beam bundle changes.

The light beam bundle BM having passed through the first retardation film 28a enters the homogenizer system 24. The homogenizer system 24 is formed of the first fly-eye lens 24a and a second fly-eye lens 24b. The first fly-eye lens 24a is provided in a position downstream of the light source unit (on light exiting side of light source unit). The first fly-eye lens 24a includes a plurality of regularly arranged lenslets 60. The second fly-eye lens 24b is provided in a position downstream of the first fly-eye lens 24a (on light exiting side of first fly-eye lens 24a). The second fly-eye lens 24b includes a plurality of regularly arranged lenslets 61 corresponding to the individual lenslets 60 of the first fly-eye lens 24a.

In the homogenizer system 24, the plurality of lenslets 60 divide the light beam bundle incident on the first fly-eye lens 24a into a plurality of small light beams and cause them to be incident on the second fly-eye lens 24b, and the homogenizer system 24 cooperates with the first pickup system 26, which will be described later, to superimpose the plurality of small light beams having exited out of the plurality of lenslets 61 with one another on a phosphor layer 271. As a result, the excitation light with which the phosphor layer 271 is irradiated has a uniform light intensity distribution or what is called a top-hat distribution.

The light beam bundle BM having passed through the homogenizer system 24 enters the optical element 25. The optical element 25 is formed of a dichroic prism having wavelength selectivity. The dichroic prism has an inclining surface K, which inclines by 45° with respect to the optical axes ax1 and ax2. The polarization separation element 50 is provided on the inclining surface K.

The polarization separation element 50 separates the light beam bundle BM into a light beam bundle $BM_{Se}$ formed of the S-polarized component with respect to the polarization separation element 50 and a light beam bundle $BM_P$ formed of the P-polarized component with respect to the polarization separation element 50. The light beam bundle $BM_{Se}$ is reflected by the polarization separation element 50 and travels as the excitation light toward the fluorescence emitting element 27. The light beam bundle $BM_P$ passes through the polarization separation element 50 and travels toward the diffusive reflection element 30. The polarization separation element 50 has a color separation function of transmitting fluorescence YL, which belongs to a wavelength band different from the wavelength band to which the blue light belongs irrespective of the polarization state of the fluorescence YL.

The light beam bundle $BM_{Se}$ reflected by the polarization separation element 50 enters the first pickup system. 26. The first pickup system 26 is formed, for example, of a pickup lens 26a and a pickup lens 26b. The first pickup system 26 causes the small light beams having exited out of the plurality of lenslets 61 to converge toward the phosphor layer 271 and superimposes the small light beams on one another on the phosphor layer 271. The pickup lenses 26a and 26b correspond to the "condenser lens" in the appended claim.

The fluorescence emitting element 27 includes the phosphor layer 271, a substrate 272, which supports the phosphor layer 271, a reflection layer 273, which is provided between the phosphor layer 271 and the substrate 272, and a motor 274, which rotates the substrate 272. The phosphor layer 271 contains phosphor excited by the excitation light having a wavelength of 460 nm (light beam bundle $BM_{Se}$). The phosphor layer 271 produces, for example, the fluorescence (yellow light) YL, the intensity of which peaks at a wavelength in a wavelength range from 500 to 700 nm.

It is preferable to use a material that excels in heat resistance and surface processability as the phosphor layer 271. Preferable examples of the phosphor layer 271 may include a phosphor layer formed of an inorganic binder which is made, for example, of alumina and in which phosphor particles are dispersed and a phosphor layer made of sintered phosphor particles without use of a binder.

The reflection layer 273 is provided one side of the phosphor layer 271, the side opposite the side on which the excitation light is incident. The reflection layer 273 has the function of reflecting the fluorescence YL produced by the phosphor layer 271. Part of the fluorescence YL produced by the phosphor layer 271 is reflected by the reflection layer 273 to exit the phosphor layer 271. The other part of the fluorescence YL produced by the phosphor layer 271 exits out of the phosphor layer 271 without traveling via the reflection layer 273. The fluorescence YL thus exits out of the phosphor layer 271. In the present embodiment, since the fluorescence emitting element 27 is irradiated with excitation light having a uniform intensity distribution, as will be described later, the fluorescence YL can be efficiently produced.

The fluorescence YL having exited out of the phosphor layer 271 is non-polarized light having polarization directions that are not aligned with one another. The fluorescence YL passes through the first pickup system 26 and then impinges on the polarization separation element 50. The fluorescence YL passes through the polarization separation element 50 and travels toward the optical integration system 31.

On the other hand, the light beam bundle $BM_P$ formed of P-polarized light and having exited out of the polarization separation element 50 enters the second retardation film 28b. The second retardation film 28b is formed of a quarter-wave plate (λ/4 plate) disposed in the optical path between the polarization separation element 50 and the diffusive reflection element 30. Therefore, the light beam bundle $BM_P$ having exited out of the polarization separation element 50 is converted by the second retardation film 28b into a circular polarized light beam bundle $BM_c$ and then enters the second pickup system 29.

The second pickup system 29 causes the light beam bundle $BM_c$ to converge toward the diffusive reflection element 30. The second pickup system 29 is formed of a first pickup lens 29a and a second pickup lens 29b.

The diffusive reflection element 30 includes a diffuser plate 301 and a motor 302, which rotates the diffuser plate 301. The diffusive reflection element 30 diffuses and reflects the light beam bundle $BM_c$ having exited out of the second pickup system 29 toward the polarization separation element 50. The diffusive reflection element 30 preferably reflects the light beam bundle $BM_c$ incident thereon in the form of Lambertian reflection.

The light beam bundle $BM_c$ diffused by and reflected by the diffusive reflection element 30 enters the second retardation film 28b again, where the light beam bundle $BM_c$ is converted into an S-polarized light beam bundle $BM_{Sd}$ and then incident on the polarization separation element 50. The light beam bundle $BM_{Sd}$ is reflected by the polarization separation element 50 toward the optical integration system 31.

The light beam bundle $BM_{Sd}$, which is the blue light, is then used, along with the fluorescence YL having passed through the polarization separation element 50, as illumination light WL. That is, the light beam bundle $BM_{Sd}$ and the fluorescence YL are directed from the polarization separation element 50 in the same direction. White illumination light WL containing the light beam bundle $BM_{Sd}$, which is the blue light, and the fluorescence YL, which is yellow light, is thus produced.

The illumination light WL having exited out of the polarization separation element 50 enters the optical integration system 31. The optical integration system 31 is formed of a lens array 31a and a lens array 31b. The lens array 31a and the lens array 31b each have a configuration in which a plurality of lenses are arranged in an array.

The illumination light WL having passed through the optical integration system 31 enters the polarization conversion element 32. The polarization conversion element 32 is formed of a polarization separation film and a retardation film that are not shown. The polarization conversion element 32 converts the non-polarized fluorescence YL into S-polarized light.

The S-polarized illumination light WL from the polarization conversion element 32 enters the superimposing system 33. The superimposing system 33 superimposes the illumination light fluxes WL having exited out of the polarization conversion element 32 on one another in an area to be illuminated. The superimposing system 33 is formed, for example, of a superimposing lens. As a result, the illuminance distributions in an effective display area of each of the light modulators 4R, 4G, and 4B are homogenized, which is the areas to be illuminated.

A description will now be made of the relationship between the plurality of light beams BM1, which form the light beam bundle BM outputted from the light source unit 21, and the plurality of lenslets 60 of the first fly-eye lens 24a, on which the plurality of light beams BM1 are incident, with reference to FIGS. 5 to 11.

Figure 5:
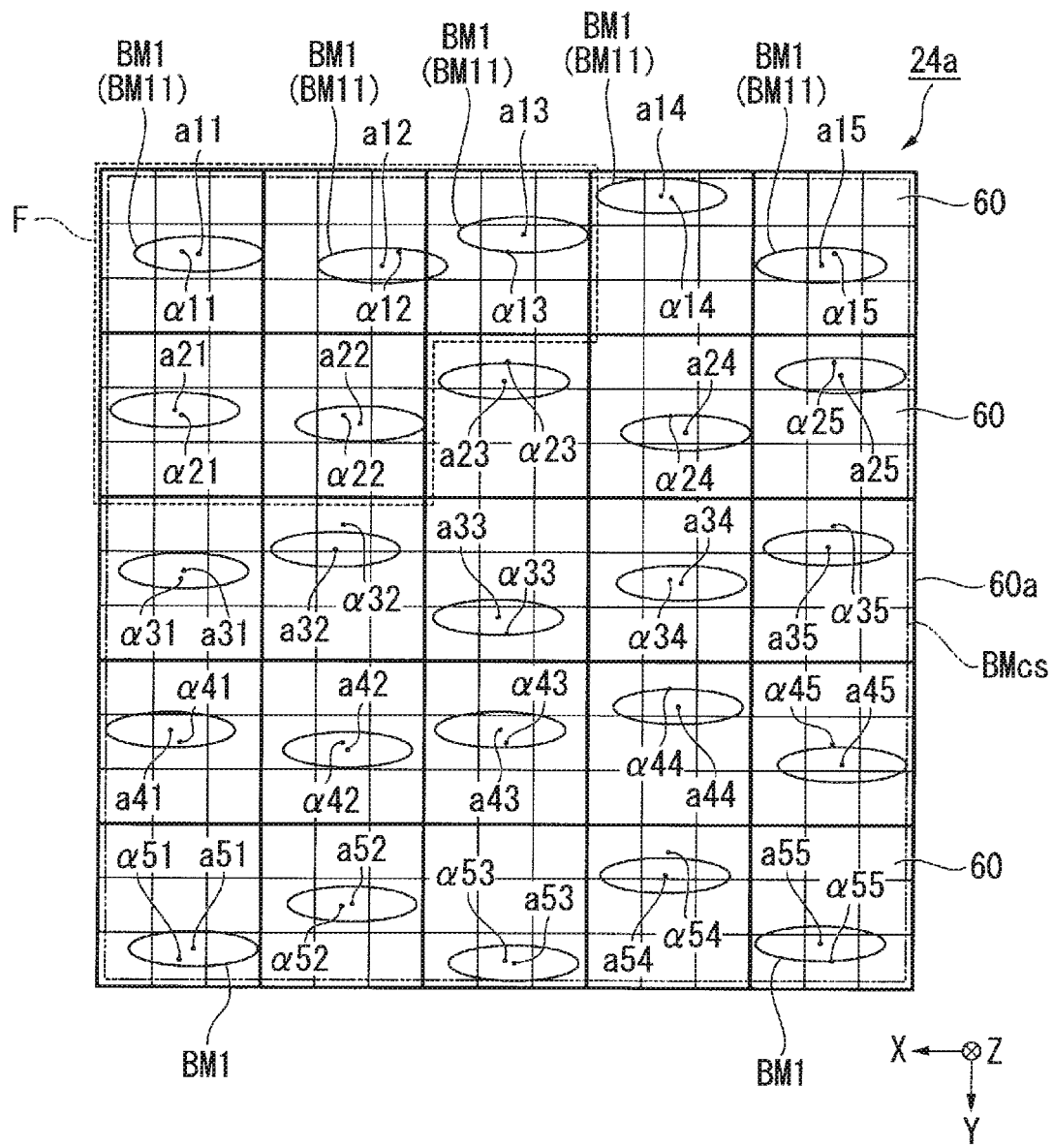
FIG. 5 shows an example of the positional relationship between the principal rays of light beams and the optical axes of lenslets on which the principal rays are incident.
Figure 6:
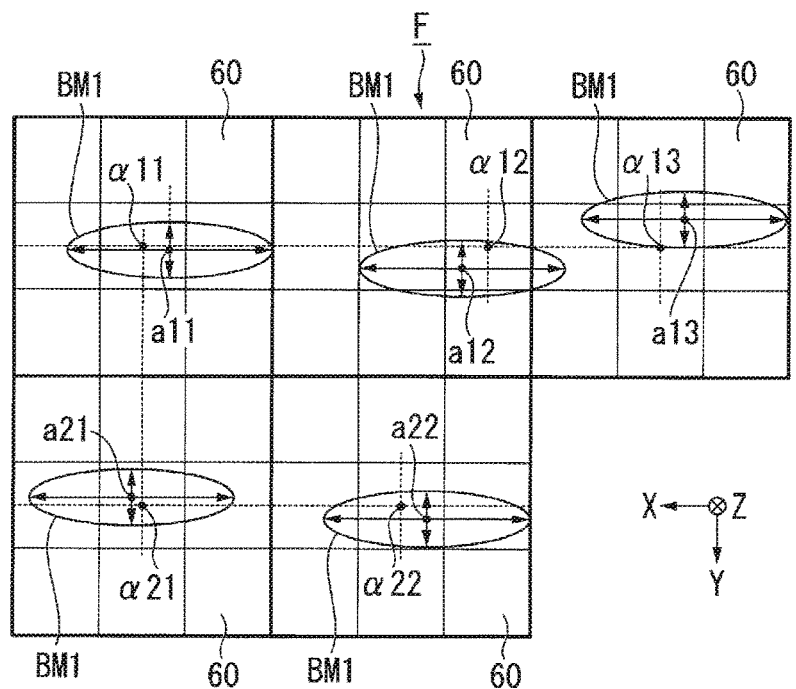
FIG. 6 is an enlarged view of a key portion in FIG. 5.

FIG. 5 shows a first example of the positional relationship between the principal rays of the light beams BM1 and the optical axes of the lenslets 60, on which the principal rays of the light beams BM1 are incident. FIG. 6 is an enlarged view of a key portion labeled with reference character F in FIG. 5.

The plurality of lenslets 60, which form the first fly-eye lens 24a, are arranged in a lattice pattern along the X-axis direction (first direction) and the Y-axis direction (second direction), as shown in FIG. 5. The area where the plurality of lenslets 60 are arranged is hereinafter referred to as a lens arrangement area 60a. The lens arrangement area 60a has a rectangular shape. In the present embodiment, since the light source unit 21 includes 25 semiconductor lasers 211, 25 light beams BM1 are incident on the lens arrangement area 60a. Among the 25 light beams BM1 shown in FIG. 5, uppermost 5 light beams BM1 correspond to the plurality of first light beams BM11 outputted from the first light source row M1. The plurality of light source rows M1 to M5 each extend roughly in the X-axis direction (first direction).

The principal rays of the plurality of light beams BM1 are incident on different ones of the plurality of lenslet 60 of the first fly-eye lens 24a. The positional relationship between the principal ray of each of the plurality of first light beams BM11 and the optical axis of the lenslet 60 on which the principal ray is incident is aperiodic over the first light source row M1.

In FIG. 5, ellipses represent the areas over which the light beams BM1 are incident on the first fly-eye lens 24a. A position where the principal ray of a light beam BM1 is incident corresponds to the center of an area where the light beam BM1 is incident. Reference character "a" denotes the light incident position. In the following description, the position where the principal ray is incident is referred to as the position where the light beam is incident in some cases. Reference character "α" denotes the position of the optical axis of a lenslet 60 on which the principal ray of the light beam BM1 is incident. Specifically, the uppermost five ellipses in FIG. 5 respectively represent the areas where the five first light beams BM11 outputted from the first light source row M1 are incident. Further, reference characters a11, a12, a13, a14, and a15 respectively denote the positions where the principal rays of the five first light beams BM11 are incident, and reference characters α11, α12, α13, α14, and α15 respectively denote the positions of the optical axes of the lenslets 60 on which the respective principal rays of the five first light beams BM11 are incident. FIG. 5 further shows the positions "a" where the plurality of light beams BM1 outputted from the light source rows M2 to M5 are incident and the positions "α" of the optical axes of the lenslets 60 on which the respective principal rays of the light beams BM1 are incident.

The light beam bundle BM outputted from the light source unit 21 is formed of 25 light beams BM1. Since the lens arrangement area 60a has a rectangular shape, it is assumed that a cross section BMcs, which is a cross section of the light beam bundle BM incident on the first fly-eye lens 24a and is parallel to the plane in which the plurality of lenslets 60 are arranged, has a rectangular shape as an approximate shape. The four sides of the cross section BMcs are parallel to the corresponding sides of the lens arrangement area 60a. Each of the four sides of the cross section BMcs is parallel to the corresponding side of the lens arrangement area 60a. Each of the sides of the cross section BMcs passes through a point on the outer edge of the light beam BM1 closest to the side of the lens arrangement area 60a that corresponds to the side of the cross section BMcs, the point closest to the corresponding side. The shape of the cross section BMcs is similar to the shape of the lens arrangement area 60a. Further, the cross section BMcs is smaller than the lens arrangement area 60a.

Now, in one of the light source rows, for example, the first light source row M1, consider the positional relationship between the positions "a" where the first light beams BM11 are incident and the positions "α" of the optical axes of the lenslets 60 on which the respective principal rays of the first light beams BM11 are incident. That is, focusing on the positional relationships between a11 and α11, a12 and α12, a13 and α13, a14 and α14, and a15 and α15 shows that the positional relationships are aperiodic over the first light source row M1. In other words, the positional relationships between the light incident positions a11 to a15 and the optical axis positions α11 to α15 aperiodically change or do not change in the same pattern on a fixed period basis.

Further, in the firs example shown in FIGS. 5 and 6, the positions a11 to a15, where the plurality of first light beams BM11 outputted from the first light source row M1 are incident, are not linearly arranged. The light incident positions a11 to a15 deviate in the Y-axis direction from a straight line parallel to the X-axis direction. Consider a distance in the X-axis direction between the light incident positions of a pair of first light beams BM11 adjacent to each other. The distance varies from pair to pair. The positional relationship described above also applies to the other light source rows M2 to M5.

In the illuminator 2 according to the present embodiment, in a light source rows, the relationship between the position where a light beam BM1 is incident and the position of the optical axis of the lenslet 60 on which the principal ray of the light beam BM1 is incident is aperiodic over the light source row, as described above. Therefore, the luminance distributions on the plurality of lenslets 60 of the first fly-eye lens 24a differ from one another, and images of the plurality of lenslets 60, the luminance distributions on which differ from one another, are superimposed on one another on the phosphor layer 271 of the fluorescence emitting element 27, which is an area to be illuminated, by the second fly-eye lens 24b and the first pickup system 26. The uniformity of the illuminance distribution of the excitation light on the phosphor layer 271 can therefore be increased as compared with the uniformity in related art. The fluorescence YL can therefore be efficiently produced.

Further, in the present embodiment, when the light beam bundle BM enters the first fly-eye lens 24a, the shape of the cross section BMcs of the light beam bundle BM is similar to the shape of the lens arrangement area 60a. Moreover, the cross section BMcs is smaller than the lens arrangement area 60a. The plurality of light beams BM1 are therefore allowed to efficiently enter the plurality of lenslets 60 of the first fly-eye lens 24a.

Further, the projector 1 according to the present embodiment, which includes the illuminator 2 capable of efficiently producing fluorescence, can project a bright image.

Second Embodiment

A second embodiment of the invention will be described below with reference to FIGS. 7 to 11.

The basic configurations of a projector and an illuminator according to the second embodiment are the same as those in the first embodiment, but the second embodiment differs from the first embodiment in terms of the positional relationship between the principal rays of the light beams and the optical axes of the lenslets of the first fly-eye lens. In the second embodiment, no description of the configurations of the projector and the illuminator will therefore be made.

Figure 7:
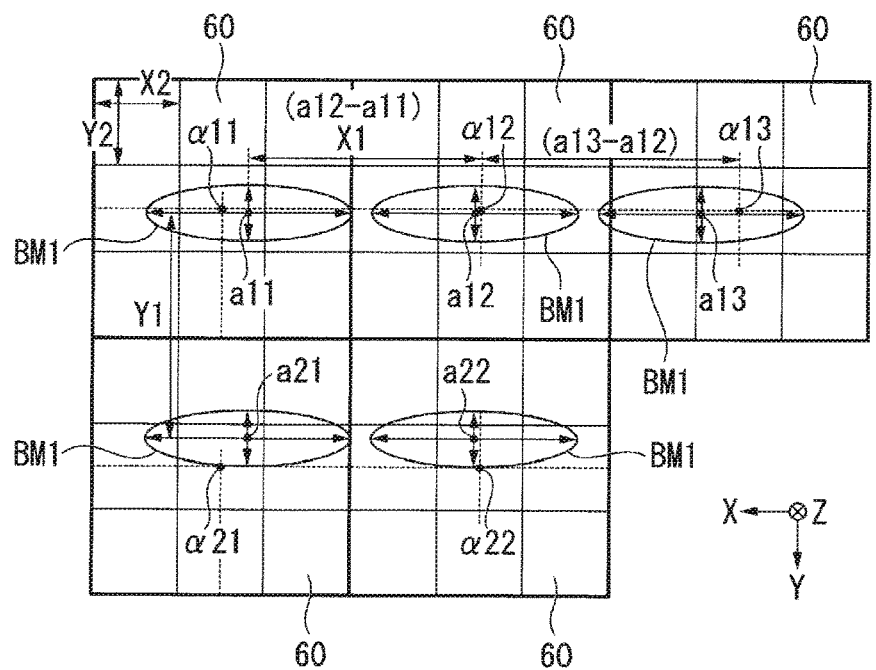
FIG. 7 shows an example of the positional relationship in an illuminator according to a second embodiment between the principal rays of light beams and the optical axes of lenslets on which the principal rays are incident.

FIG. 7 shows an example of the positional relationship in the illuminator according to the second embodiment between the principal rays of a plurality of light beams and the optical axes of a plurality of lenslets of the first fly-eye lens. FIG. 7 corresponds to FIG. 6 in the first embodiment and is an enlarged view of the lenslets in part of the first fly-eye lens. Also in the present embodiment, the light source unit includes 25 semiconductor lasers.

In FIG. 7, the components common to those in the drawings used in the first embodiment have the same reference characters and will not be described.

Also in the illuminator according to the second embodiment, a plurality of lenslets 60, which form the first fly-eye lens 24a, are arranged in a lattice pattern along the X-axis direction (first direction) and the Y-axis direction (second direction). The plurality of light source rows M1 to M5 each extend roughly in the X-axis direction (first direction).

In the first embodiment, the plurality of semiconductor lasers 211 are not arranged at equal intervals in the X-axis direction (first direction), and the positions where the plurality of light beams BM1 are incident are therefore not equally separate from each other in the first direction, as shown in FIG. 6. In contrast, in the second embodiment, the semiconductor lasers 211 are arranged at equal intervals in the X-axis direction (first direction). That is, when the light beam bundle BM enters the first fly-eye lens 24a, the positions where the plurality of light beams BM1 are incident are equally separate from each other in the first direction, as shown in FIG. 7.

The positions a11, a12, a13, a14, and a15, where the plurality of first light beams BM11 are incident, are arranged on a straight line parallel to the X-axis direction. The same holds true for the other light source rows M2 to M5. Further, the positions "a" where the plurality of light beams BM1 outputted from the light source rows M1 to M5 are incident are arranged in a lattice pattern along the X-axis direction and the Y-axis direction.

The positions a11, a12, a13, a14, and a15, where the plurality of first light beams BM11 are incident, are not necessarily arranged on a straight line parallel to the X-axis direction and may instead deviate in the Y-axis direction (second direction) from the straight line parallel to the X-axis direction. Even this case is included in the concept that a plurality of light emitting devices are arranged at equal intervals in the X-axis direction (first direction), as long as the intervals in the direction parallel to the X-axis direction (intervals expressed by X coordinate) are equal to one another.

Let X1 be the X-axis-direction arrangement pitch of the plurality of light beams BM1 incident on the first fly-eye lens 24a and Y1 be the Y-axis-direction arrangement pitch of the plurality of light beams BM1 incident on the first fly-eye lens 24a. Further, let X2 be the X-axis-direction arrangement pitch of the plurality of lenslets 60 and Y2 be the Y-axis-direction arrangement pitch of the plurality of lenslets 60.

In the present embodiment, the X-axis-direction arrangement pitch X1 of the plurality of light beams BM1 is a non-integer multiple of the X-axis-direction arrangement pitch X2 of the plurality of lenslets 60. That is, $X1 \neq X2 \times m$ (m: integer).

In the second embodiment, the positions "a" where the plurality of light beams BM1 outputted from the light source rows M1 to M5 are incident are arranged at equal intervals in the X-axis and Y-axis directions, unlike in the first embodiment. The plurality of lenslets 60, which form the first fly-eye lens 24a, is arranged at a constant pitch in a lattice pattern along the X-axis direction and the Y-axis direction. In a light source row, for example, in the first light source row M1, however, the arrangement pitch of the plurality of light beams BM1 and the arrangement pitch of the plurality of lenslets 60 are so set as to satisfy X1≠X2×m, so that the positional relationship between each principal ray and the optical axis of the lenslet 60 on which the principal ray is incident is aperiodic over the light source row.

The present inventors have examined the relationship between the position where each principal ray is incident and the position of the optical axis of the lenslet 60 on which the principal ray is incident for a variety of combinations of the arrangement pitch X1 of the plurality of light beams BM1 and the arrangement pitch X2 of the plurality of lenslets 60 with the combinations satisfying the relationship X1≠X2×m (m: integer).

FIRST CALCULATION EXAMPLE

The present inventors set the X-axis-direction arrangement pitch X1 of the positions where the plurality of principal rays are incident at 2 mm and X-axis-direction arrangement pitch X2 of the plurality of lenslets 60 at 0.13 mm and calculated deviation of the position where the principal ray is incident from the position of the center of the lenslet 60 on which the principal ray is incident for 10 principal rays (2≠0.13×m (m: integer)).

Table 1 shows values a1x and α1x representing the position where the x-th principal ray is incident and the position of the center of the lenslet 60 on which the x-th principal ray is incident, respectively measured from the origin and expressed in the form of X coordinate. Table 1 further shows the amount of deviation α1x-a1x of the position where the x-th principal ray is incident from the position of the center of the lenslet 60 on which the x-th principal ray is incident.

TABLE 1

| x | $\alpha_{1x}$ [mm] | $a_{1x}$ [mm] | $\alpha_{1x} - a_{1x}$ [mm] |
|---|---|---|---|
| 1 | 1.95 | 2 | 0.05 |
| 2 | 4.03 | 4 | -0.03 |
| 3 | 5.98 | 6 | 0.02 |
| 4 | 8.06 | 8 | -0.06 |
| 5 | 10.01 | 10 | -0.01 |
| 6 | 11.96 | 12 | 0.04 |
| 7 | 14.04 | 14 | -0.04 |
| 8 | 15.99 | 16 | 0.01 |
| 9 | 17.94 | 18 | 0.06 |
| 10 | 20.02 | 20 | -0.02 |

Figure 8:
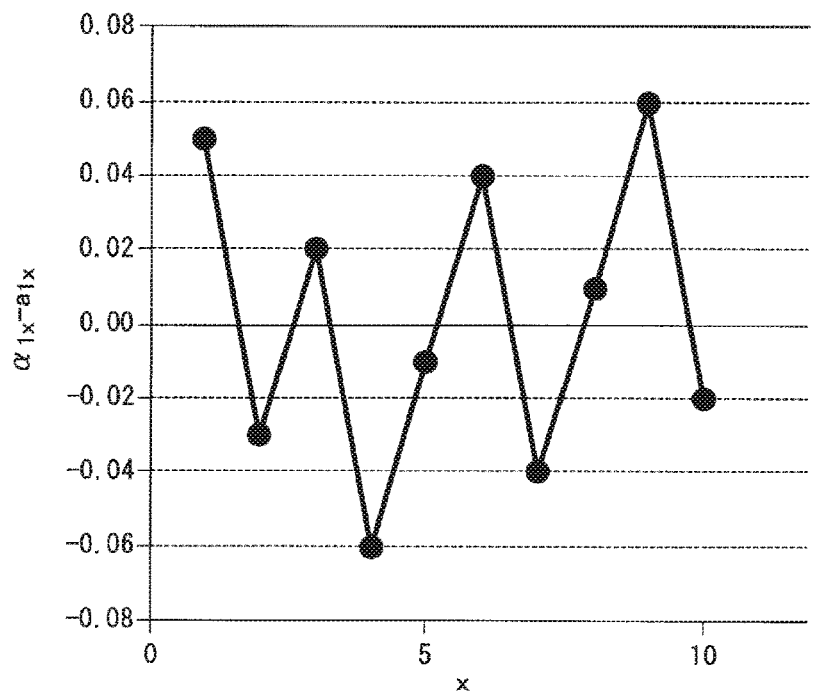
FIG. 8 shows a first calculation example of the relationship between the position of a light beam on a first fly-eye lens and the distance between the coordinates of the position of the optical axis of a lenslet and the coordinates of the position of the principal ray of the light beam.

FIG. 8 shows the calculation results in Table 1. In FIG. 8, the horizontal axis represents x, and the vertical axis represents α1x-a1x [mm].

FIG. 8 shows that the amount of deviation α1x-a1x aperiodically changes. The fact that the aperiodic change means that α1x-a1x does not repeat when x increases.

SECOND CALCULATION EXAMPLE

In the present calculation example, a1x, α1x, and the amount of deviation α1x-a1x are calculated with the arrangement pitch X1 set at 2 mm and the arrangement pitch X2 set at 0.11 mm. The arrangement pitch X1 is a non-integer multiple of the arrangement pitch X2. Table 2 shows results of the calculation.

TABLE 2

| x | $\alpha_{1x}$ [mm] | $a_{1x}$ [mm] | $\alpha_{1x} - a_{1x}$ [mm] |
|---|---|---|---|
| 1 | 1.98 | 2 | 0.02 |
| 2 | 3.96 | 4 | 0.04 |
| 3 | 6.05 | 6 | -0.05 |
| 4 | 8.03 | 8 | -0.03 |
| 5 | 10.01 | 10 | -0.01 |
| 6 | 11.99 | 12 | 0.01 |
| 7 | 13.97 | 14 | 0.03 |
| 8 | 15.95 | 16 | 0.05 |
| 9 | 18.04 | 18 | -0.04 |
| 10 | 20.02 | 20 | -0.02 |

Figure 9:
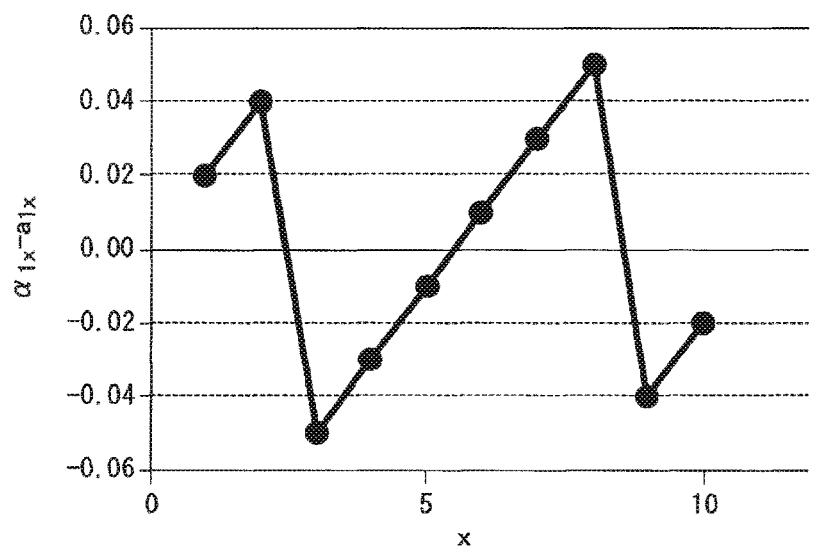
FIG. 9 shows a second calculation example of the relationship between the position of a light beam on the first fly-eye lens and the distance between the coordinates of the position of the optical axis of a lenslet and the coordinates of the position of the principal ray of the light beam.

FIG. 9 shows the calculation results in Table 2. In FIG. 9, the horizontal axis represents x, and the vertical axis represents α1x-a1x [mm]. FIG. 9 shows that the amount of deviation α1x-a1x aperiodically changes.

THIRD CALCULATION EXAMPLE

In the present calculation example, a1x, α1x, and the amount of deviation α1x-a1x are calculated with the arrangement pitch X1 set at 2 mm and the arrangement pitch X2 set at 0.09 mm. The arrangement pitch X1 is a non-integer multiple of the arrangement pitch X2. Table 3 shows results of the calculation.

TABLE 3

| x | $\alpha_{1x}$ [mm] | $a_{1x}$ [mm] | $\alpha_{1x} - a_{1x}$ [mm] |
|---|---|---|---|
| 1 | 1.98 | 2 | 0.02 |
| 2 | 3.96 | 4 | 0.04 |
| 3 | 6.03 | 6 | -0.03 |
| 4 | 8.01 | 8 | -0.01 |
| 5 | 9.99 | 10 | 0.01 |
| 6 | 11.97 | 12 | 0.03 |
| 7 | 14.04 | 14 | -0.04 |
| 8 | 16.02 | 16 | -0.02 |
| 9 | 18 | 18 | 0 |
| 10 | 19.98 | 20 | 0.02 |

Figure 10:
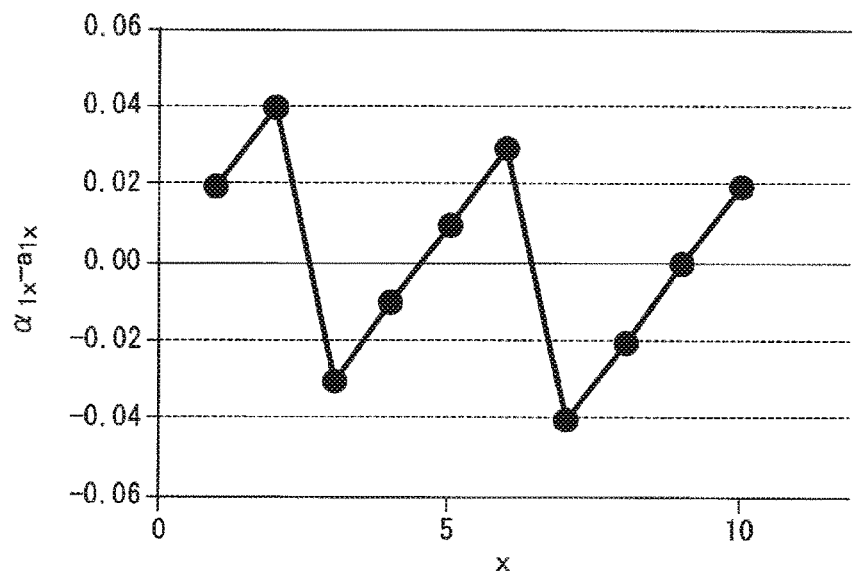
FIG. 10 shows a third calculation example of the relationship between the position of a light beam on the first fly-eye lens and the distance between the coordinates of the position of the optical axis of a lenslet and the coordinates of the position of the principal ray of the light beam.

FIG. 10 shows the calculation results in Table 3. In FIG. 10, the horizontal axis represents x, and the vertical axis represents α1x-a1x [mm].

FIG. 10 shows that the amount of deviation α1x-a1x aperiodically changes.

FOURTH CALCULATION EXAMPLE

In the present calculation example, a1x, α1x, and the amount of deviation α1x-a1x are calculated with the arrangement pitch X1 set at 1.5 mm and the arrangement pitch X2 set at 0.13 mm. The arrangement pitch X1 is a non-integer multiple of the arrangement pitch X2. Table 4 shows results of the calculation.

TABLE 4

| x | $\alpha_{1x}$ [mm] | $a_{1x}$ [mm] | $\alpha_{1x} - a_{1x}$ [mm] |
|---|---|---|---|
| 1 | 1.56 | 1.5 | -0.06 |
| 2 | 2.99 | 3 | 0.01 |
| 3 | 4.55 | 4.5 | -0.05 |
| 4 | 5.98 | 6 | 0.02 |
| 5 | 7.54 | 7.5 | -0.04 |
| 6 | 8.97 | 9 | 0.03 |
| 7 | 10.53 | 10.5 | -0.03 |

TABLE 4-continued

| x | $\alpha_{1x}$ [mm] | $a_{1x}$ [mm] | $\alpha_{1x} - a_{1x}$ [mm] |
|---|---|---|---|
| 8 | 11.96 | 12 | 0.04 |
| 9 | 13.52 | 13.5 | −0.02 |
| 10 | 14.95 | 15 | 0.05 |

Figure 11:
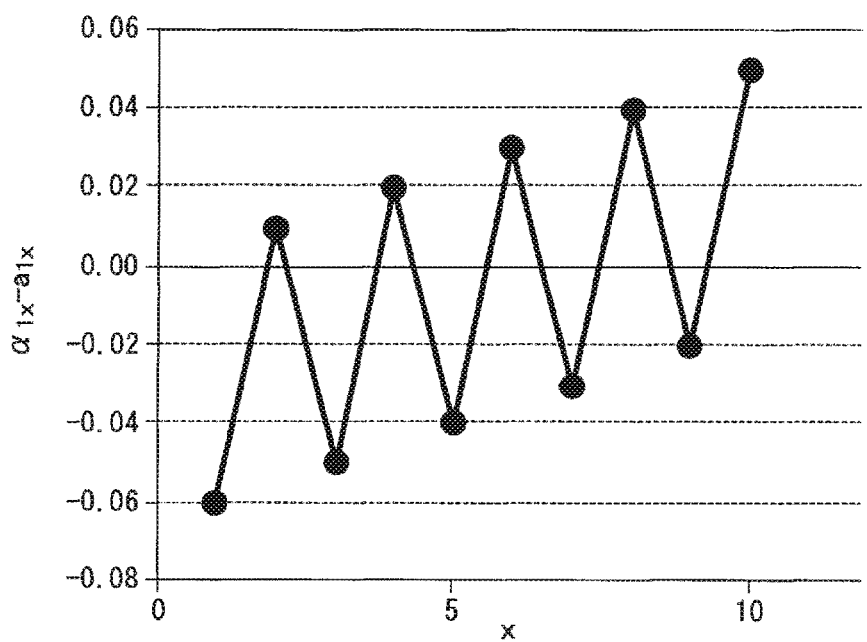
FIG. 11 shows a fourth calculation example of the relationship between the position of a light beam on the first fly-eye lens and the distance between the coordinates of the position of the optical axis of a lenslet and the coordinates of the position of the principal ray of the light beam.

FIG. 11 shows the calculation results in Table 4. In FIG. 11, the horizontal axis represents x, and the vertical axis represents α1x-a1x [mm].

FIG. 11 shows that the amount of deviation α1x-a1x aperiodically changes.

FIFTH CALCULATION EXAMPLE

In the present calculation example, a1x, α1x, and the amount of deviation α1x-a1x are calculated with the arrangement pitch X1 set at 4 mm and the arrangement pitch X2 set at 0.13 mm. The arrangement pitch X1 is a non-integer multiple of the arrangement pitch X2. Table 5 shows results of the calculation.

TABLE 5

| x | $\alpha_{1x}$ [mm] | $a_{1x}$ [mm] | $\alpha_{1x} - a_{1x}$ [mm] |
|---|---|---|---|
| 1 | 4.03 | 4 | −0.03 |
| 2 | 8.06 | 8 | −0.06 |
| 3 | 11.96 | 12 | 0.04 |
| 4 | 15.99 | 16 | 0.01 |
| 5 | 20.02 | 20 | −0.02 |
| 6 | 24.05 | 24 | −0.05 |
| 7 | 27.95 | 28 | 0.05 |
| 8 | 31.98 | 32 | 0.02 |
| 9 | 36.01 | 36 | −0.01 |
| 10 | 40.04 | 40 | −0.04 |

Figure 12:
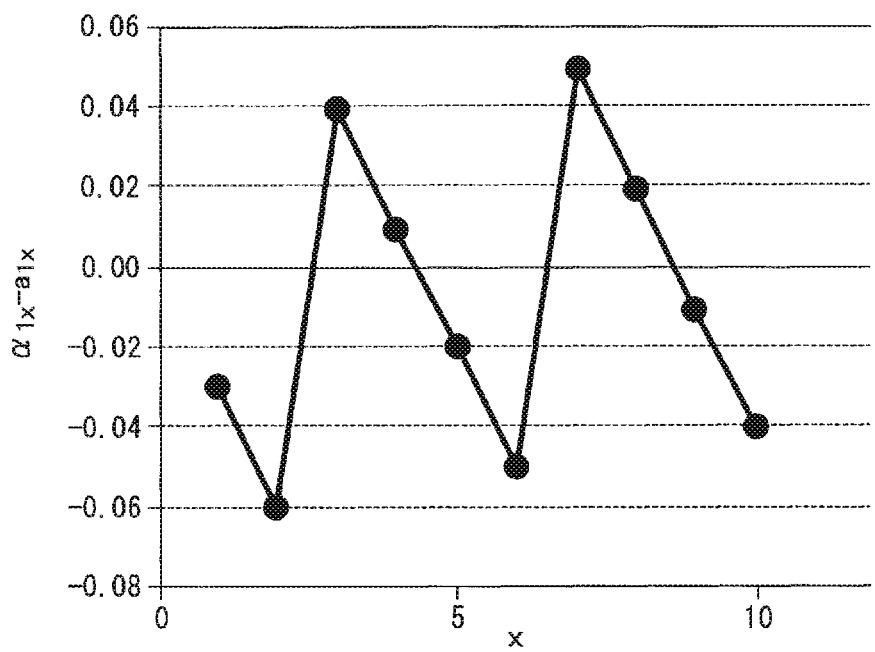
FIG. 12 shows a fifth calculation example of the relationship between the position of a light beam on the first fly-eye lens and the distance between the coordinates of the position of the optical axis of a lenslet and the coordinates of the position of the principal ray of the light beam.

FIG. 12 shows the calculation results in Table 5. In FIG. 12, the horizontal axis represents x, and the vertical axis represents α1x-a1x [mm].

FIG. 12 shows that the amount of deviation α1x-a1x aperiodically changes.

Also in the illuminator according to the present embodiment, in each light source row, since the positional relationship between each light beam and the optical axis of the lenslet 60 on which the light beam is incident is aperiodic over the light source row, the uniformity of the illumination distribution of the excitation light on the phosphor layer 271 can be desirably increased as compared with the uniformity in related art, as in the first embodiment. When Y1 and Y2 are so set as to satisfy Y1≠Y2×n as well as X1≠X2×m, the uniformity of the illuminance distribution can be further increased.

In the present embodiment, just setting the arrangement pitches, namely the arrangement pitch of the positions where the plurality of light beams are incident and the arrangement pitch of the plurality of lenslets 60, at respective appropriate values readily provides the aperiodic positional relationship between each light beam and the optical axis of the lenslet on which the light beam is incident.

The technical scope of the invention is not limited to the embodiments described above, and a variety of changes can be made thereto to the extent that the changes do not depart from the substance of the invention.

For example, the embodiments described above have been described with reference to the illuminator that outputs light beams from the plurality of light source rows in a direction roughly parallel to the surface on which the plurality of light source rows are arranged. In place of the configuration described above, the illuminator may output light beams from the plurality of light source rows in a direction roughly perpendicular to the surface on which the plurality of light source rows are arranged. In the case where the plurality of light source rows are arranged as described above, no prism (reflection member) is required because the plurality of light beams travel toward the light transmissive member.

In the embodiments described above, the five semiconductor lasers 211 arranged in the X-axis direction form one first light source row, as shown in FIG. 4. The five semiconductor lasers 211 arranged in the Y-axis direction may instead be considered as a light source row. In this case, the Y-axis direction corresponds to the first direction.

Further, in the embodiments described above, the projector including three light modulators is presented by way of example, and the invention is also applicable to a projector that displays color video images with a single light modulator. Moreover, each of the light modulators is not limited to the liquid crystal panel described above and can, for example, be a digital mirror device.

In addition to the above, the shape, the number, the arrangement, the material, and other factors of the variety of components of the illuminator and the projector are not limited to those in the embodiments described above and can be changed as appropriate.

Further, the above embodiments have been described with reference to the case where the illuminator according to each of the embodiments of the invention is incorporated in a projector, but not necessarily. The illuminator according to any of the embodiments of the invention may be used as a lighting apparatus, a headlight of an automobile, and other components.

The entire disclosure of Japanese Patent Application No. 2016-146421, filed on Jul. 26, 2016 is expressly incorporated by reference herein.

What is claimed is:

1. An illuminator comprising: a light source unit that includes two or more light source rows each formed of a plurality of light emitting devices and outputs a light beam bundle, each of the two or more light source rows extending in a first direction, the two or more light source rows being arranged along a second direction that intersects the first direction; a first fly-eye lens that is provided in a position downstream of the light source unit and includes a plurality of lenslets; a second fly-eye lens that is provided in a position downstream of the first fly-eye lens; and a condenser lens that is provided in a position downstream of the second fly-eye lens, wherein principal rays of a plurality of first light beams outputted from a first light source row of the two or more light source rows are incident on at least three different lenslets of the plurality of lenslets, the at least three different lenslets being arranged in a row parallel to the first direction, and the light emitting devices of the first light source row are arranged at different locations in the first direction, and at least one of the light emitting devices of the first light source row is at a position in the second direction different from a position in the second direction of at least another one of the light emitting devices of the first light source row, whereby a positional relationship between a principal ray of each of the plurality of first light beams and an optical axis of a lenslet on which the principal ray is incident of the plurality of lenslets is aperiodic over the first light source row, areas over which the respective first light beams outputted from the light source rows are incident on the first fly-eye lens are ellipses, respectively, and longitudinal direction of the ellipses is parallel to the first direction.

2. The illuminator according to claim 1,
wherein the plurality of lenslets are arranged in a lattice pattern along the first direction and the second direction,
when the light beam bundle enters the first fly-eye lens, the plurality of first light beams are arranged in the first direction, and
an arrangement pitch of the plurality of first light beams in the first direction is a non-integer multiple of an arrangement pitch of the plurality of lenslets in the first direction.

3. The illuminator according to claim 2,
wherein the two or more light source rows comprise a plurality of light source rows,
when the light beam bundle enters the first fly-eye lens, the light beam bundle has a cross-section that is similar to a shape of an area where the plurality of lenslets are arranged, the cross-section being parallel to a plane in which the plurality of lenslets are arranged, and
the cross-section is smaller than the area where the plurality of lenslets are arranged.

4. The illuminator according to claim 1,
wherein the light source unit further includes a base that supports the two or more light source rows and still further includes two or more reflection elements provided in correspondence with the two or more light source rows,
a direction in which the first light source row outputs the plurality of first light beams is roughly parallel to a surface on which the two or more light source rows are arranged,
the two or more reflection elements each have one reflection surface, and
a first reflection element of the two or more reflection elements is so disposed that the plurality of first light beams outputted from the first light source row reflects off the reflection surface of the first reflection element to enter the first fly-eye lens.

5. A projector comprising:
the illuminator according to claim 1;
a light modulator that modulates light outputted from the illuminator, in accordance with image information; and
a projection system that projects the light modulated by the light modulator.

6. A projector comprising:
the illuminator according to claim 2;
a light modulator that modulates light outputted from the illuminator, in accordance with image information; and
a projection system that projects the light modulated by the light modulator.

7. A projector comprising:
the illuminator according to claim 3;
a light modulator that modulates light outputted from the illuminator, in accordance with image information; and
a projection system that projects the light modulated by the light modulator.

8. A projector comprising:
the illuminator according to claim 4;
a light modulator that modulates light outputted from the illuminator, in accordance with image information; and
a projection system that projects the light modulated by the light modulator.

9. An illuminator comprising:
a light source unit that outputs a light beam bundle;
a first fly-eye lens that is provided in a position downstream of the light source unit and includes a plurality of lenslets;
a second fly-eye lens that is provided in a position downstream of the first fly-eye lens; and
a condenser lens that is provided in a position downstream of the second fly-eye lens,
wherein the light source unit comprises two or more light source rows that include a first light source row, each of the two or more light source rows extending in a first direction, the two or more light source rows being arranged along a second direction that intersects the first direction, the first light source row including light emitting devices,
the light emitting devices of the first light source row are arranged at different locations in the first direction, and intervals between the light emitting devices of the first light source row in the first direction are different than intervals between light emitting devices of another light source row of the two or more light source rows in the first direction,
principal rays of a plurality of first light beams outputted from the first light source row are incident on different lenslets of the plurality of lenslets,
a positional relationship between a principal ray of each of the plurality of first light beams and an optical axis of a lenslet on which the principal ray is incident of the plurality of lenslets is aperiodic over the first light source row,
areas over which the respective first light beams outputted from the light source rows are incident on the first fly-eye lens are ellipses, respectively, and
longitudinal direction of the ellipses is parallel to the first direction.

10. The illuminator according to claim 9,
wherein the plurality of lenslets are arranged in a lattice pattern along the first direction and the second direction,
when the light beam bundle enters the first fly-eye lens, the plurality of first light beams are arranged in the first direction, and
an arrangement pitch of the plurality of first light beams in the first direction is a non-integer multiple of an arrangement pitch of the plurality of lenslets in the first direction.

11. The illuminator according to claim 10,
wherein the two or more light source rows comprise a plurality of light source rows,
when the light beam bundle enters the first fly-eye lens, the light beam bundle has a cross-section that is similar to a shape of an area where the plurality of lenslets are arranged, the cross-section being parallel to a plane in which the plurality of lenslets are arranged, and
the cross-section is smaller than the area where the plurality of lenslets are arranged.

12. The illuminator according to claim 9,
wherein the light source unit further includes a base that supports the two or more light source rows and still further includes two or more reflection elements provided in correspondence with the two or more light source rows,
a direction in which the first light source row outputs the plurality of first light beams is roughly parallel to a surface on which the two or more light source rows are arranged,
the two or more reflection elements each have one reflection surface, and a first reflection element of the two or more reflection elements is so disposed that the plurality of first light beams outputted from the first light source row reflects off the reflection surface of the first reflection element to enter the first fly-eye lens.

13. A projector comprising:

the illuminator according to claim 9;

a light modulator that modulates light outputted from the illuminator, in accordance with image information; and a projection system that projects the light modulated by the light modulator.

14. A projector comprising:

the illuminator according to claim 10;

a light modulator that modulates light outputted from the illuminator, in accordance with image information; and a projection system that projects the light modulated by the light modulator.

15. A projector comprising:

the illuminator according to claim 11;

a light modulator that modulates light outputted from the illuminator, in accordance with image information; and a projection system that projects the light modulated by the light modulator.

16. A projector comprising:

the illuminator according to claim 12;

a light modulator that modulates light outputted from the illuminator, in accordance with image information; and a projection system that projects the light modulated by the light modulator.

17. The illuminator according to claim 1, wherein the three different lenslets are also arranged in a direction that intersects the first direction.

18. The illuminator according to claim 1, wherein a number of lenslets arranged in the row parallel to the first direction is larger than a number of lenslets arranged in the direction that intersects the first direction.

\* \* \* \* \*